United States Patent [19]

Horn et al.

[11] 4,443,964
[45] Apr. 24, 1984

[54] INSECT TRAP

[75] Inventors: John D. Horn, Hingham; Ralph J. Hodosh, Norwood, both of Mass.

[73] Assignee: Albany International Corp., Albany, N.Y.

[21] Appl. No.: 309,983

[22] Filed: Oct. 9, 1981

[51] Int. Cl.³ .......................... A01M 1/02; A01M 1/10
[52] U.S. Cl. ........................................................ 43/118
[58] Field of Search ................. 43/118, 107, 108, 122; D22/19

[56] References Cited

U.S. PATENT DOCUMENTS

| | | | |
|---|---|---|---|
| 951,763 | 3/1910 | Malphurs | 43/122 |
| 1,279,951 | 9/1918 | Wetzel | 43/122 |
| 1,311,001 | 7/1919 | Manseau | 43/108 |
| 3,807,081 | 4/1974 | Chapiewsky | 43/118 |

FOREIGN PATENT DOCUMENTS 16703 of 1884 United Kingdom .................. 43/122

OTHER PUBLICATIONS

Hartstack, A. W., J. A. Witz, and D. R. Buck, "Moth Traps for the Tobacco Budworm," *J. Econ. Entomol.*, vol. 72, p. 519, Aug. 1979.

*Primary Examiner*—Nicholas P. Godici
*Assistant Examiner*—Charles L. Willis
*Attorney, Agent, or Firm*—Kane, Dalsimer, Kane, Sullivan and Kurucz

[57] ABSTRACT

Disclosure is made of a novel trap which is specifically useful for the entrapment of *Heliothis virescens* and related insects. The trap comprises a skewed frusto-conic member having open ends and fabricated from a reticulated, flexible, synthetic material. At one open end, a container fabricated from reticulated side walls of a synthetic, polymeric resin secures and closes that open end. A removable closure allows entry into the chamber formed in the container. The trap is supported with the container closed end uppermost and the opposite open end lowermost. Support means in a simple embodiment comprises lacings or loops secured to a staff.

1 Claim, 1 Drawing Figure

U.S. Patent    Apr. 24, 1984    4,443,964
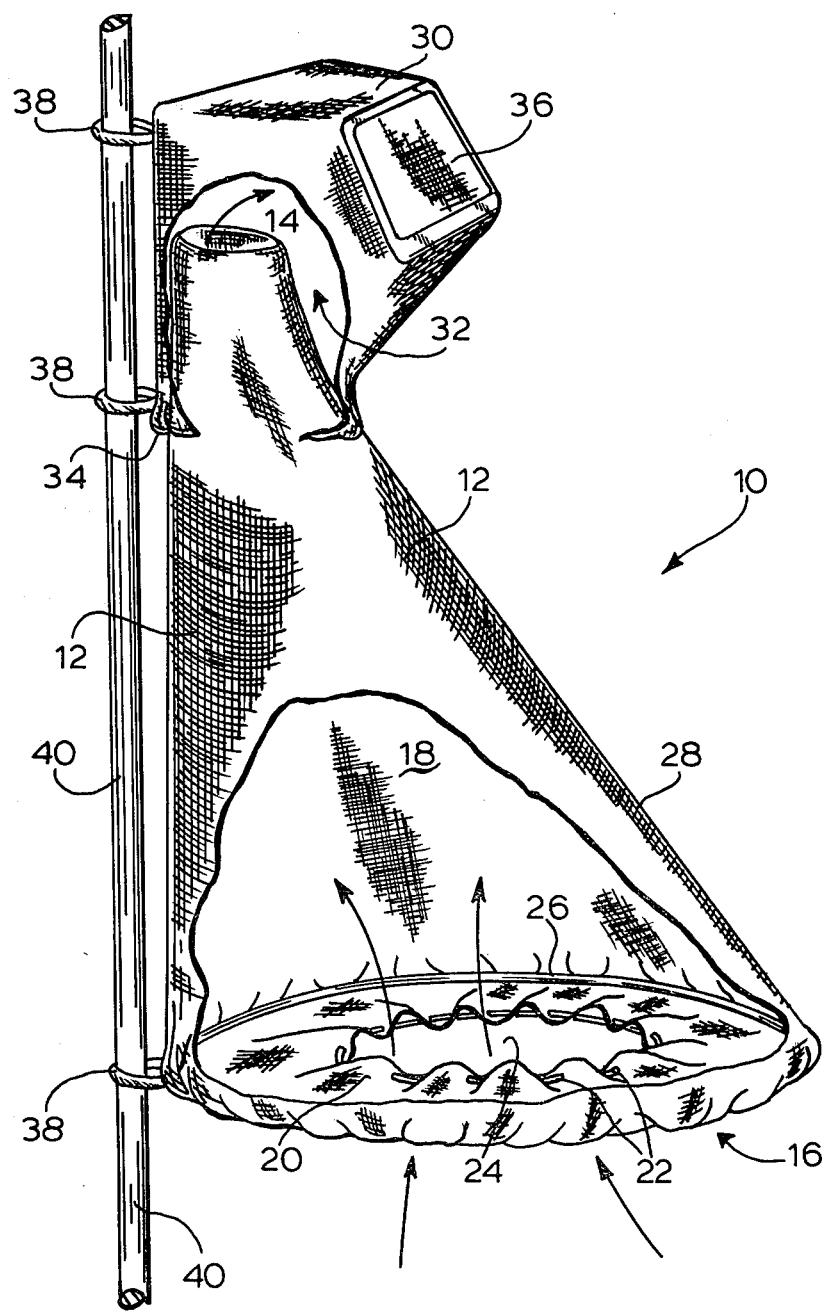

INSECT TRAP

BACKGROUND OF THE INVENTION

1. Field of the Invention

The invention relates to insect traps and more particularly relates to a trap for insects of the order Lepidoptera and even more particularly relates to a trap for species in the genus Heliothis and insects displaying similar behavior.

2. Brief Description of the Prior Art

The description by Hartstack et al., appearing in the J. Econ. Entomol., 72:519-522 (1979) is representative of the prior art.

Among other things, the trap of our invention is an improvement over prior art traps in that:

A. Shipping and Storage: Because our preferred trap is made primarily of a plastic mesh, it is lighter and more collapsible than the previously existing trap. These features make our preferred trap easier to transport and store. B. Installation, Use and Handling: Our traps are easily stationed in the field. They may be quickly attached to a stake and easily raised or lowered into position. Furthermore, previous traps were fabricated from wire mesh and had many sharp edges. Users complained that the sharp edges cut hands. Our trap, because of construction, will be much less likely to harm the user. Another advantage of our trap is that the height of the trap and therefore the position of the entry opening (lower open end) can be easily adjusted relative to the height of growing plants, the top of which is often the insect's preferred flight zone. Previous traps made of metal mesh are less easily adjusted in the field.

C. Production Expense: The metal mesh traps have proven expensive to produce. In contrast non-metallic mesh traps can be made with relatively inexpensive materials using available textile manufacturing techniques such as sewing.

SUMMARY OF THE INVENTION

The invention comprises a trap, which comprises;

a skewed frusto-conic member having a reticulated sidewall of a flexible, synthetic, material, an open upper end, a partially closed lower end, a bore communicating between the ends, one portion of said sidewall being obliquely inclined outwardly from upper to lower end;

a container with reticulated sidewalls of a synthetic, polymeric resin defining a chamber, and an open end adapted by size and configuration to mate with and close the upper open end of the cylindrical member;

said container being mounted through its open end on the open end of the skewed frusto-conic member, whereby the bore of the member is in open communication with the chamber and the open end of the skewed frusto-conic member is closed by the container;

removable closure means in a wall of the container providing access to the chamber; and means attached to the member, for supporting the assembled member and container in an upright position.

The trap of the invention is useful for trapping insects of the order Lepidoptera such as species in the genus Heliothis such as Heliothis virescens and insects displaying similar behavior.

BRIEF DESCRIPTION OF THE DRAWING

The accompanying drawing is a view of a preferred embodiment trap of the invention, partially cut away to show the interior thereof.

DETAILED DESCRIPTION OF THE PREFERRED EMBODIMENTS OF THE INVENTION

The accompanying drawing is a view of a preferred embodiment trap of the invention, having a sidewall partially cut away to show the interior thereof. The trap 10 comprises a substantially skewed frusto-conic member 12 having an open upper end 14 and a partially closed lower end 16. A bore 18 provides open communication inside of the skewed frusto-conic member 12, communicating between the open end 14 and the partially closed end 16.

The skewed frusto-conic member 12 is preferably made up of a flexible, reticulated material such as a textile fabric or a synthetic, polymeric resin mesh. Representative of such reticulated, flexible material are meshes of synthetic, polymeric resins such as polypropylene, polyethylene, of woven fiberglass, textile fabrics and the like. Such mesh materials are commercially available and have been used as insect screening for windows, doorways and the like.

The partially closed end 16 of skewed frusto-conic member 12 is formed by folding over of an extension 20 of the sidewall of the member 12. A drawstring 22 supports the partial closure and leaves an aperture 24 so that the bore 18 is in open communication with the outside of skewed frusto-conic member 12. A drawstring 22 is not necessary to the trap 10 and any other means of partially closing the end 16 may be employed. However, a drawstring 22 provides a means of adjusting the diameter of aperture 24. The extension 20 is folded over a support ring 26 which supports the partially closed end 16 as shown in the drawing.

One portion 28 of the sidewall forming skewed frusto-conic member 12 is inclined outwardly from the upper end 14 to the lower end 16 so that the overall shape of the skewed frusto-conic member 12 is that of an inverted, off-center funnel. This is a preferred shape for the entrapment of species of the insect Heliothis as will be explained more fully hereinafter.

Mounted on the open end 14 of skewed frusto-conic member 12 and functioning as a closure for open end 14 is a collection container 30 which may be fabricated from the same material employed to fabricate the skewed frusto-conic member 12. The container 30 has reticulated sidewalls which define an interior chamber 32 which is in open communication with the bore 18 through the open end 14. The container 30 has an open lower end 34 which by size and configuration is adapted to mate with and close the open end 14 of skewed frusto-conic member 12. The container end 34 may be secured by stitching or like means if desired to prevent its removal from the open end 14 of skewed frusto-conic member 12 or it may be frictionally engaged therewith for removal and storage when not in use. A removable and reclosable closure 36 is in one sidewall of the container 30 to provide access to the interior chamber 32. The closure 36 may be secured to container 30 by any conventional means including adhesives, stitchings, zippers, etc.

Loops 38 are attached to the skewed frusto-conic member 12 and container 30 as shown in the drawing.

Loops 38 function as a means for supporting the trap 10 in an upright position as shown in the drawing. A rod 40 has been inserted through the loops 38 as a support means. The convenience of doing so is shown in the drawing, and is a function of the straight portion of skewed frusto-conic member 12. If, for example, the member 12 were a cone shape rather than a skewed frusto-conic shape, such a straight portion of the sidewall would not be obtained. The use of loops 38 to support trap 10 on rod 40 has an added advantage in that they permit the trap 10 to be raised or lowered in height above the ground surface without being removed from rod 40.

The employment of a rod 40 as a support means provides vertical stability to the trap 10, and in combination with the ring 26 which provides horizontal stability, an exceptionally stable structure is obtained.

In use, an attractant for the Heliothis insects such as a sex attractant is positioned near the aperture 24. For example, attracted by the female pheromone, the male insect enters chamber 18 through aperture 24 and will alight on the inner shelf area formed by the folded material 20. Not finding a female conspecific, the insect begins a search pattern to find the source of attractant. Field studies have shown that the attracted insect will, after alighting on the shelf, fly upward looking for the source of the sex attracting lure. The shape of the trap 10 is conducive to leading the moth through the open end 14 and into the collection container 30 where it is trapped. Entrapment is carried out in part due to the insect's behavior which invariably does not permit it to return to the bore 18 and out of the opening 24.

At periodic intervals, one may open the closure 36 to count and/or collect entrapped insects of the Heliothis species.

Those skilled in the art will appreciate that many variations may be made of the above described preferred embodiment without departing from the spirit and scope of the invention. For example, other means of support besides a rod 40 may be employed to suspend the trap 10, i.e.; for example, hooks.

What is claimed:

1. A trap, which comprises:

a skewed frusto-conic member having a reticulated sidewall of a flexible, synthetic, material an open upper end, a partially closed lower end, a bore communicating between the ends, one portion of said sidewall being obliquely inclined outwardly from upper to lower end, another portion of said sidewall being substantially vertical;

a container with reticulated sidewalls of a synthetic, polymeric resin defining a chamber, having an open end adapted by size and configuration to mate with and close the upper open end of the skewed frusto-conic member;

said container being mounted through its open end on the upper open end of the skewed frusto-conic member so as to close said open end, whereby the bore of the member is in open communication with the chamber;

removable closure means in a wall of the container providing access to the chamber and means attached to the member along said substantially vertical portion of said sidewall for supporting the assembled member and container in an upright position.

* * * * *